US009897008B2

(12) United States Patent
Meyers et al.

(10) Patent No.: US 9,897,008 B2
(45) Date of Patent: Feb. 20, 2018

(54) CONDUIT ASSEMBLY AND METHOD OF UTILIZATION

(71) Applicants: Gregory Meyers, West Hartford, CT (US); Paul E. Strong, Bristol, CT (US); Sohail M. Ahmed, Carmel, IN (US); Prasanth Busareddy, Rocky Hill, CT (US)

(72) Inventors: Gregory Meyers, West Hartford, CT (US); Paul E. Strong, Bristol, CT (US); Sohail M. Ahmed, Carmel, IN (US); Prasanth Busareddy, Rocky Hill, CT (US)

(73) Assignee: United Technologies Corporation, Farmington, CT (US)

( * ) Notice: Subject to any disclaimer, the term of this patent is extended or adjusted under 35 U.S.C. 154(b) by 257 days.

(21) Appl. No.: 14/601,014

(22) Filed: Jan. 20, 2015

(65) Prior Publication Data

US 2016/0208707 A1    Jul. 21, 2016

(51) Int. Cl.
*F16L 21/06* (2006.01)
*F02C 7/20* (2006.01)
*F02C 7/22* (2006.01)

(52) U.S. Cl.
CPC ............... *F02C 7/20* (2013.01); *F02C 7/222* (2013.01); *F05D 2230/64* (2013.01); *F05D 2230/642* (2013.01); *F05D 2250/41* (2013.01); *F05D 2260/30* (2013.01); *F16L 21/065* (2013.01)

(58) Field of Classification Search
CPC ............... F16L 21/065; F02C 7/222
USPC .......................... 285/374, 373, 367
See application file for complete search history.

(56) References Cited

U.S. PATENT DOCUMENTS

| 421,647 A * | 2/1890 | Ambrose ............ F16L 37/0841 |
| | | 285/374 |
| 1,007,326 A * | 10/1911 | Boyd ............... F16L 23/20 |
| | | 126/119 |
| 1,020,002 A * | 3/1912 | Warner ............. F16L 21/08 |
| | | 138/159 |
| 1,175,438 A * | 3/1916 | Gzupkaytie .......... F16L 37/252 |
| | | 285/374 |
| 1,331,987 A * | 2/1920 | Griffin ............... F23J 3/06 |
| | | 285/367 |

(Continued)

OTHER PUBLICATIONS

Extended EP Search Report dated Jun. 14, 2016.

*Primary Examiner* — David E Bochna
(74) *Attorney, Agent, or Firm* — O'Shea Getz P.C.

(57) ABSTRACT

A conduit assembly and method of utilizing the assembly generally extends along a centerline for detachable engagement to a component in an axial direction. The assembly may include a body having an internal, cylindrical, surface with a first surface portion located axially adjacent to a second surface portion. The first portion is circumferentially continuous and the second portion extends circumferentially by about 180 degrees or less. A saddle is axially aligned to the second portion and detachably connects to the body. The saddle extends circumferentially by about 180 degrees or more. A conduit is received in the body and rigidly secured to the body via the saddle. A circumferentially continuous sealing interface is carried between the first portion and the conduit, and is constructed and arranged to slide axially with respect to the first portion and the conduit.

14 Claims, 3 Drawing Sheets

(56) References Cited

U.S. PATENT DOCUMENTS

| | | | | |
|---|---|---|---|---|
| 1,511,723 | A * | 10/1924 | Draver | F16L 25/04 |
| | | | | 285/322 |
| 1,879,364 | A | 9/1932 | Lomar | |
| 2,273,396 | A | 2/1942 | Couty | |
| 2,333,580 | A * | 11/1943 | Renshaw | H02G 3/0658 |
| | | | | 285/341 |
| 2,531,401 | A * | 11/1950 | Clerke | F16L 17/02 |
| | | | | 285/349 |
| 3,336,056 | A | 8/1967 | Cassel et al. | |
| 3,488,069 | A | 1/1970 | Balon | |
| 3,679,235 | A | 7/1972 | Faccou | |
| 4,045,060 | A * | 8/1977 | Daigle | F16L 21/08 |
| | | | | 285/373 |
| 4,152,017 | A | 5/1979 | Abramson | |
| 4,300,792 | A | 11/1981 | Donnelly | |
| 4,380,178 | A | 4/1983 | Bennett et al. | |
| 4,821,818 | A | 4/1989 | Mefferd | |
| 5,222,486 | A | 6/1993 | Vaughn | |
| 5,694,922 | A | 12/1997 | Palmer | |
| 6,364,372 | B1 * | 4/2002 | Marandi | F16L 21/06 |
| | | | | 285/367 |
| 6,648,377 | B2 * | 11/2003 | Marandi | F16L 41/06 |
| | | | | 285/376 |
| 8,336,920 | B2 | 12/2012 | Stempo et al. | |
| 8,690,194 | B1 * | 4/2014 | Smith | F16L 25/0036 |
| | | | | 285/373 |
| 9,086,181 | B2 * | 7/2015 | Lei | F16L 37/26 |
| 2005/0012329 | A1 | 1/2005 | Brown | |
| 2014/0245740 | A1 * | 9/2014 | Wiebe | F02C 7/222 |
| | | | | 60/740 |

* cited by examiner

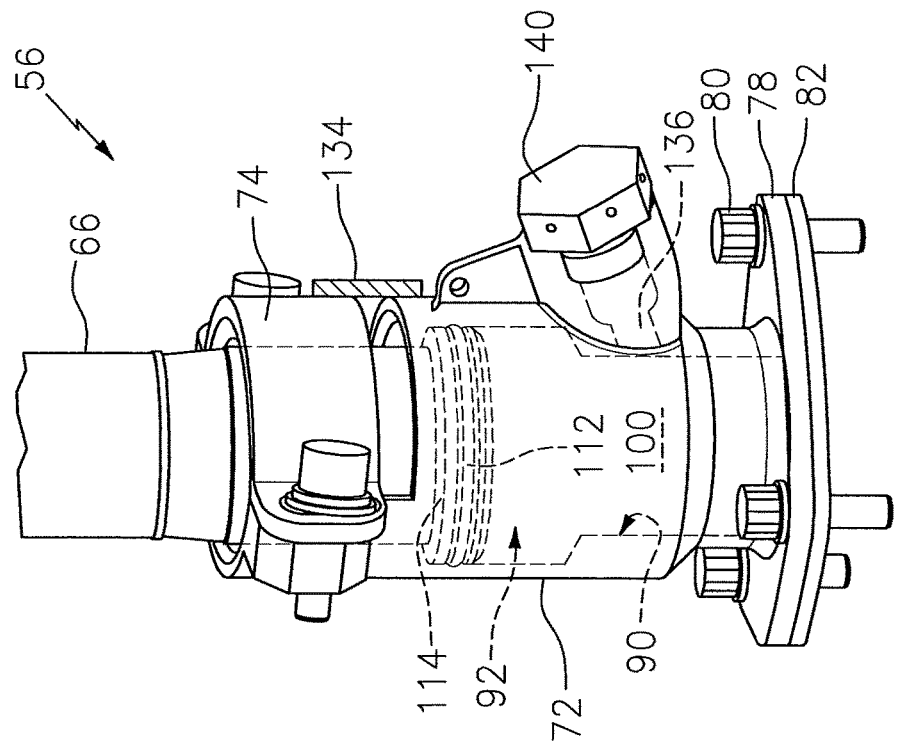
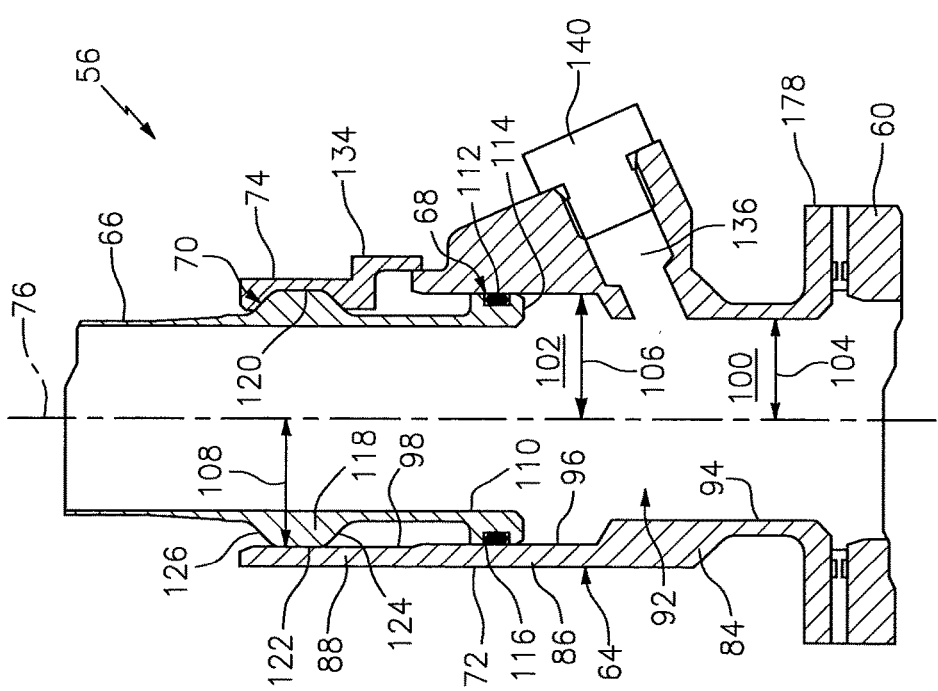

CONDUIT ASSEMBLY AND METHOD OF UTILIZATION

BACKGROUND

The present disclosure relates to a conduit assembly, and more particularly to a rigid conduit assembly having a manipulative adaptor.

Conduit assemblies are typically used to flow any variety of fluids between two components. Some assemblies are at least in-part flexible and others are rigid, but both must be capable of maintaining a seal to prevent leakage. In some applications, flexible conduit assemblies may be applied and may further utilize a braided flexible tubing with many sealing interfaces. In other applications, a rigid conduit assembly and/or a combination of rigid and flexible conduits are preferred. One such rigid conduit assembly application may be utilized in numerous areas of a gas turbine engine. Unfortunately, such areas are often known to have limited space and complex packaging with an abundance of surrounding hardware thereby forcing the use of what may be a less desirable flexible conduit assembly.

It remains desirable to further develop hard-line or rigid conduit assemblies that have the manipulative positioning advantages of a flexible assembly. It is further desirable to develop a conduit assembly that is more robust, has less parts, is less expensive and facilitates ease of assembly and maintenance with the assembly itself and/or connected components.

SUMMARY

A conduit assembly orientated about a centerline for detachable engagement to a component in an axial direction, according to one, non-limiting, embodiment includes a body including an internal surface having a circumferentially continuous first portion and a second portion axially disposed adjacent to the first portion and extending circumferentially by about 180 degrees or less; a saddle axially aligned to the second portion and detachably connected to the body, wherein the saddle extends circumferentially by about 180 degrees or more; a conduit; and a circumferentially continuous sealing interface carried between the first portion and the conduit, the sealing interface including a seal constructed and arranged to slide axially with respect to and supported by at least one of the first portion and the conduit.

Additionally to the foregoing embodiment, the first and second portions are generally cylindrical and the second portion has a radius that is equal to or greater than a radius of the first portion.

In the alternative or additionally thereto, in the foregoing embodiment, the sealing interface includes a carrier projecting radially outward from the conduit.

In the alternative or additionally thereto, in the foregoing embodiment, the carrier is proximate to an end of the conduit.

In the alternative or additionally thereto, in the foregoing embodiment, a groove in the carrier is opened radially outward for receipt of the seal.

In the alternative or additionally thereto, in the foregoing embodiment, the seal is a resiliently compressible o-ring.

In the alternative or additionally thereto, in the foregoing embodiment, the assembly includes an axially indexing interface carried between the conduit and the saddle.

In the alternative or additionally thereto, in the foregoing embodiment, the indexing interface includes a landing projecting radially and received, at least in-part, in a channel with the landing and the channel constructed and arranged between the conduit and the saddle.

In the alternative or additionally thereto, in the foregoing embodiment, the landing projects outward from the conduit and the channel is in the saddle.

In the alternative or additionally thereto, in the foregoing embodiment, the landing is circumferentially continuous and includes a frustum shaped cross section contoured to fit snugly to the saddle within the channel to axially align and hold rigid the conduit to the body.

In the alternative or additionally thereto, in the foregoing embodiment, the saddle includes a skirting for heat shielding.

In the alternative or additionally thereto, in the foregoing embodiment, the first portion spans axially beyond the sealing interface.

In the alternative or additionally thereto, in the foregoing embodiment, the assembly is engaged to and communicates between a fuel-oil cooler and a fuel pump in a gas turbine engine for the flow of fuel.

An adaptor of a conduit assembly according to another, non-limiting, embodiment includes a body extending along a centerline, the body having an end segment and an axially adjacent second segment, with the end segment having a hemi-cylindrical surface portion facing radially inward and the second segment having a cylindrical surface portion defining at least in-part a passage, and at least one port extending through the body for fluid communication with the passage; a saddle detachably engaged to the end segment from a radial direction such that the end segment combined with the saddle are circumferentially continuous; and wherein the body in constructed and arranged to detachably engage a component from an axial direction.

A method of utilizing a conduit assembly according to another, non-limiting, embodiment includes the steps of axially aligning and concentrically locating a conduit end to an end segment of a body via at least radial movement between the body and the conduit end; initializing a sealing interface via further axial insertion of the conduit end into the body; and establishing an axial indexing interface via securing a saddle to the end segment.

Additionally to the foregoing embodiment, the method includes the step of aligning the body of the assembly to a component by rotating the body with respect to the conduit.

In the alternative or additionally thereto, in the foregoing embodiment, a portion of a landing is fitted into a channel in the saddle and a portion of the landing contacts an inner surface portion carrier by the end segment when the indexing interface is established.

In the alternative or additionally thereto, in the foregoing embodiment, the method includes the step of securing the body to a component as the body moves further axially with respect to the conduit and the sealing interface is maintained.

In the alternative or additionally thereto, in the foregoing embodiment, the method includes the step of sensing fluid within the assembly via a port extending through the body.

In the alternative or additionally thereto, in the foregoing embodiment, the assembly is held rigid via the indexing interface.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed, non-limiting, embodiments. The drawings that accompany the detailed description can be briefly described as follows:

FIG. 4 is a cross-section of the conduit assembly; and

FIG. 5 is a fragmented cross section of the conduit assembly.

DETAILED DESCRIPTION

Figure 1:
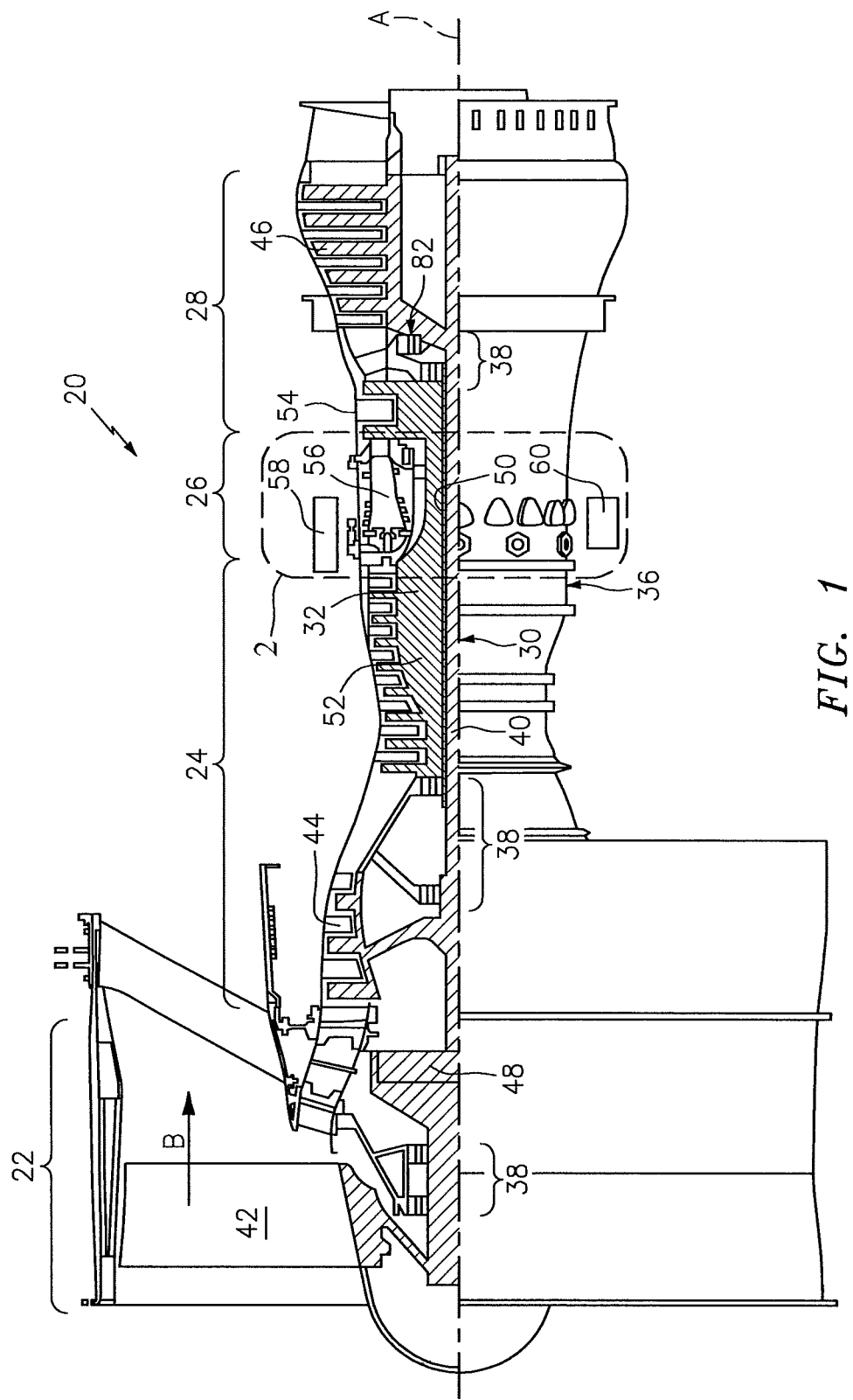
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmenter section (not shown) among other systems or features. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an intermediate pressure compressor ("IPC") between a Low Pressure Compressor ("LPC") and a High Pressure Compressor ("HPC"), and an Intermediate Pressure Turbine ("IPT") between the High Pressure Turbine ("HPT") and the Low Pressure Turbine ("LPT").

The engine 20 generally includes a low spool 30 and a high spool 32 mounted for rotation about a central, longitudinal, engine axis A relative to an engine case 36 via several bearing structures 38. The low spool 30 generally includes an inner shaft 40 that interconnects a fan 42 of the fan section 22, a LPC 44 of the compressor section 24 and a LPT 46 of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a HPC 52 of the compressor section 24 and HPT 54 of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes. Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood; however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet (10,668 meters). This flight condition, with the gas turbine engine 20 at its best fuel consumption, is also known as Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane System. The low Fan Pressure Ratio according to one, non-limiting, embodiment of the example gas turbine engine 20 is less than 1.45. Low Corrected Fan Tip Speed is the actual fan tip speed divided by an industry standard temperature correction of $(T/518.7)^{0.5}$ in which "T" represents the ambient temperature in degrees Rankine. The Low Corrected Fan Tip Speed according to one non-limiting embodiment of the example gas turbine engine 20 is less than about 1,150 feet per second (351 meters per second).

Figure 2:
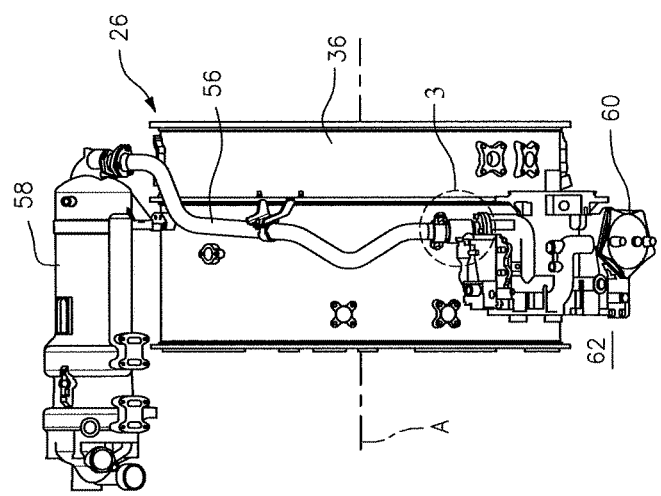
FIG. 2 is a perspective view of a conduit assembly in one, non-limiting example interconnecting a fuel-oil cooler with a fuel pump of the engine and taken from circle 2 of FIG. 1.

Referring to FIG. 2, a generally rigid conduit assembly 56 may be in fluid communication with and extends between a fuel-oil cooler 58 and a fuel pump 60. The cooler 58 and the fuel pump 60 may be detachably engaged to and supported by the engine case 36 proximate to the combustor section 26. The conduit assembly 56, cooler 58, and fuel pump 60 may be located within a generally annular cavity 62 having boundaries generally defined by the engine case 36 and an outer nacelle casing (not shown). In many applications, packaging of auxiliary equipment that support operation of the engine 20 creates cramped conditions within the cavity 62, thereby making assembly and maintenance operations within the cavity 62 difficult. It is further contemplated and understood that the conduit assembly 56 may be applied to any application and is not necessarily limited to gas turbine engines. Moreover, the cooler 58 and pump 60 is only one, non-limiting, example, and may be any component where removal of the component(s) with interconnecting, rigid, conduits (and/or installation of rigid conduits to the components) may be particularly difficult due to surrounding conditions and packaging. For example, the component 60 may be associated with the geared architecture 48 and the conduit assembly 56 may facilitate the delivery of oil or air as oppose to fuel.

Figure 3:
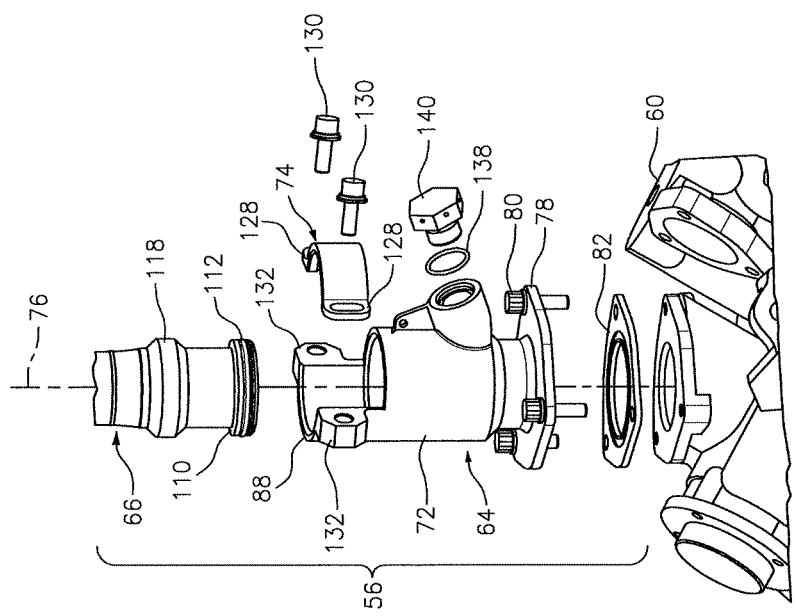
FIG. 3 is an exploded perspective view of the conduit assembly taken from circle 3 of FIG. 2.

Referring to FIGS. 3 through 5, the conduit assembly 56 may include an adapter 64 detachably engaged to the component 60, a conduit 66 for fluid flow between components, and sealing and indexing interfaces 68, 70 both carried between the adapter and conduit. The adapter 64 may include a body 72 that detachably secures to the component 60 and a saddle 74 that detachably secures to the body 72. The sealing interface 68 may be carried between the conduit 66 and the body 72, and the indexing interface 70 may be carried between the saddle 74 and the conduit 66. The conduit 66 and body 72 generally extend axially along a centerline 76 of the assembly 56.

The body 72 of the adapter 64 may have a radially projecting flange 78 for adapter engagement to the component 60 via a plurality of threaded fasteners or bolts 80 (three illustrated) with a gasket 82. The body 72 may further include three axially displaced segments 84, 86, 88 (see FIG. 4). The flange 78 may project outward from an end of the first or base segment 84. The mid segment 86 spans axially between and is engaged to the base segment 84 and the distal segment 88, and the distal segment 88 projects outward from the mid segment 86 with respect to the centerline 76. Unlike segments 84, 86, the distal segment 88 does not extend circumferentially continuously about the centerline 76. The segments 84, 86, 88, together, carry an internal, substantially cylindrical, surface 90 that defines, at least in-part, the boundary of a generally cylindrical passage 92 for receipt of the conduit 66.

The surface 90 may generally be divided into a plurality of axially distributed portions 94, 96, 98 with the radius of each respective portion increasing as the body 72 projects axially away from the component 60 and flange 78. The first portion 94 of the surface 90 may be carried by the base segment 84 of the body 72 and defines a boundary of a counter bore 100 of the passage 92. The second or mid portion 96 of the surface 90 may be carried by the mid segment 86 of the body 72 and defines a boundary of a bore 102 of the passage 92. The third portion 98 of the surface 90 is carried by the distal segment 88 of the body 72, is not circumferentially continuous, and may be hemi-cylindrical extending circumferentially by about 180 degrees or slightly less. The portions 94, 96, 98 of the surface 90 each have a respective radius (see arrows 104, 106, and 108). Radius 104 of surface portion 94 may be less than radius 106 of surface portion 96, and radius 106 may be less than or equal to radius 108 of surface portion 98.

The sealing interface 68 of the assembly 56 prevents fluid leakage and is constructed and arranged to move axially with respect to centerline 76. The sealing interface 68 is generally carried between the surface portion 96 carried by the mid segment 86 of the body 72 and an end 110 of the conduit 66, and may have a circumferentially continuous seal 112 that may be a resiliently compressible o-ring made of a fluoropolymer elastomer as one, non-limiting, example. The sealing interface 68 may further include a circumferentially continuous carrier 114 that may project radially outward from the conduit 66 proximate to the end 110. A circumferentially continuous groove 116 in the carrier 114 may be opened radially outward for receipt and seating of the seal 112. When assembled, the seal 112 may be resiliently compressed radially with respect to centerline 76 and directly between the carrier 114 and the mid surface portion 96 of the mid segment 86 of the body 72. Although not illustrated, it is further contemplated and understood that the groove 116 may be in the mid portion 96 of the body 72 and opened radially inward for receipt of the seal 112. In this alternative embodiment, the seal may be compressed radially with respect to the centerline 76 and directly against the conduit 66. It is further contemplated that the seal 112 may be a piston ring as another, non-limiting, example.

The indexing interface 70 of the assembly 56 generally and rigidly holds the conduit 66 firmly to the adapter 64 at a pre-defined axial position. The indexing interface 70 may include a circumferentially continuous landing 118 projecting radially outward from the conduit 66 and a channel 120 in the saddle 74 for receipt of a hemi-cylindrical portion of the landing 118. The landing 118 and the carrier 114 may be formed directly to the conduit 66 such that the landing, carrier and conduit are one homogeneous piece. The landing 118 may generally have a chamfered cross section, and thus may carry a cylindrical mid-face 122 located axially between flanking angled faces 124, 126 that extend axially and radially inward from the mid-face and toward the conduit 66 by about forty-five degrees. When assembled, the landing 118 fits snugly into the channel 120 in the saddle 74 and a hemi-cylindrical portion of the cylindrical mid-face 122 of the landing 118 may be in general contact with the surface portion 98 of the distal segment 88 of the body 72. The chamfered cross section of the landing 118, and the similar cross section profile of the channel 120, facilitates repeated axial positioning of the conduit 66 with respect to the adaptor 64 (i.e. conical surface contact).

The saddle 74 may have opposite end flanges 128 each having a hole for receipt of respective threaded fasteners or bolts 130 that thread into the similar flanges 132 projecting radially outward from the distal segment 88 of the body 72. As best shown in FIG. 4, the saddle 74 may have a skirting 134 that extends axially toward the mid segment 86 for closing any axial gap between the saddle and the mid segment for thermal protection of the sealing interface 68. At least one port 136 may extend through the body 72 and through the surface portion 94 of the base segment 84. Because the port is in fluid communication with the counter bore 100, and not the bore 102 of the passage 92, the port 136 will not interfere with the sealing interface 68. The port 136 may facilitate engine inspection and maintenance operations allowing for the addition of any variety of sensors (e.g. pressure and temperature). When not in use, the port 136 may be sealed with a seal 138 (e.g. a gasket or o-ring) and a threaded cap 140.

During assembly, disassembly and/or engine maintenance operations, the conduit assembly 56 facilitates both axial and rotational manipulation of the rigid conduit or tube 66 (without the use of more traditional braided flex tubing) for ease of installation under what may be close proximity to other hardware in confined spaces. A method of assembly, for example, may include a first step 200 of axially inserting the conduit end 110 from the distal end of the body segment 88. As an alternative first step 202, or in combination with step 200, the conduit end 110 may be initially placed proximate to the surface portion 98 of the end segment 88 of the body 72 from a lateral or radial direction with respect to the centerline 76 and as dictated by the packaging restrictions of surrounding hardware. That is, the conduit end 110 may be axially aligned to the end segment 88 and concentrically located to the centerline 76 via movement in at least a radial direction. A subsequent step 204 may include continuing axial insertion of the conduit 66 until the landing 118 contacts the surface portion 98 of the end segment 88 and the seal 112 contacts the surface portion 96 of the body mid-segment 86 thereby initializing the sealing interface 68. A next step 206 may include rotating the body 72 with respect to the centerline 76 and until the flange 78 and fasteners 80 appropriately align with the component 60 for engagement thereto. Once rotationally aligned, a next step 208 may include fastening the body 72 to the component 60 while the body 72 simultaneously moves axially with respect to the rigid conduit 66 as the fasteners are tightened. Once secured, another step 210 may include securing the saddle 74, from a radial direction, to the body end segment 88 thereby completing the indexing interface 70.

It is further understood and contemplated that any number or combination of the steps involved in the method of assembly may be interchanged or omitted. Moreover, other methods may be facilitated via the conduit assembly 56. For instance, a method of easily removing the component 60 without complete removal of the conduit assembly 56 may involve decoupling the adaptor flange 78 from the component 60, decoupling the saddle 74 from the body end segment 88, then moving the body 72 axially away from the component and along the conduit until an appropriate clearance is established while generally maintain the sealing interface 68. Any required rotation of the body 72 with respect to the conduit 66 may also be conducted at this time.

While the invention is described with reference to exemplary embodiments, it will be understood by those skilled in the art that various changes may be made and equivalents may be substituted without departing from the spirit and scope of the invention. In addition, different modifications may be made to adapt the teachings of the invention to particular situations or materials, without departing from the essential scope thereof. The invention is thus not limited to the particular examples disclosed herein, but includes all embodiments falling within the scope of the appended claims.

What is claimed is:

1. A conduit assembly orientated about a centerline for detachable engagement to a component in an axial direction, the conduit assembly comprising:
   a body including an internal surface having a circumferentially continuous first portion and a second portion axially disposed adjacent to the first portion and extending circumferentially by about 180 degrees or less;
   a saddle axially aligned to the second portion and detachably connected to the body, wherein the saddle extends circumferentially by about 180 degrees or more;
   a conduit; and
   a circumferentially continuous sealing interface carried between the first portion and the conduit, the sealing interface including a seal constructed and arranged to slide axially with respect to and supported by at least one of the first portion and the conduit,
   wherein the sealing interface includes a carrier projecting radially outward from the conduit.

2. The conduit assembly set forth in claim 1, wherein the first and second portions are generally cylindrical and the second portion has a radius that is equal to or greater than a radius of the first portion.

3. The conduit assembly set forth in claim 2, wherein the first portion spans axially beyond the sealing interface.

4. The conduit assembly set forth in claim 1, wherein the carrier is proximate to an end of the conduit.

5. The conduit assembly set forth in claim 4, wherein a groove in the carrier is opened radially outward for receipt of the seal.

6. The conduit assembly set forth in claim 5, wherein the seal is a resiliently compressible o-ring.

7. The conduit assembly set forth in claim 1 further comprising:
   an axially indexing interface carried between the conduit and the saddle.

8. The conduit assembly set forth in claim 7, wherein the indexing interface includes a landing projecting radially and received, at least in-part, in a channel with the landing and the channel constructed and arranged between the conduit and the saddle.

9. The conduit assembly set forth in claim 8, wherein the landing projects outward from the conduit and the channel is in the saddle.

10. The conduit assembly set forth in claim 8, wherein the landing is circumferentially continuous and includes a frustum shaped cross section contoured to fit snugly to the saddle within the channel to axially align and hold rigid the conduit to the body.

11. The conduit assembly set forth in claim 1, wherein the saddle includes a skirting for heat shielding.

12. The conduit assembly set forth in claim 1, wherein the assembly is engaged to and communicates between a fuel-oil cooler and a fuel pump in a gas turbine engine for the flow of fuel.

13. A conduit assembly orientated about a centerline for detachable engagement to a component in an axial direction, the conduit assembly comprising:
   a body including an internal surface having a circumferentially continuous first portion and a second portion axially disposed adjacent to the first portion and extending circumferentially by about 180 degrees or less;
   a saddle axially aligned to the second portion and detachably connected to the body, wherein the saddle extends circumferentially by about 180 degrees or more;
   a conduit;
   a circumferentially continuous sealing interface carried between the first portion and the conduit, the sealing interface including a seal constructed and arranged to slide axially with respect to and supported by at least one of the first portion and the conduit; and
   an axially indexing interface carried between the conduit and the saddle,
   wherein the indexing interface includes a landing projecting radially and received, at least in-part, in a channel with the landing and the channel constructed and arranged between the conduit and the saddle, and
   wherein the landing is circumferentially continuous and includes a frustum shaped cross section contoured to fit snugly to the saddle within the channel to axially align and hold rigid the conduit to the body.

14. A conduit assembly orientated about a centerline for detachable engagement to a component in an axial direction, the conduit assembly comprising:
   a body including an internal surface having a circumferentially continuous first portion and a second portion axially disposed adjacent to the first portion and extending circumferentially by about 180 degrees or less;
   a saddle axially aligned to the second portion and detachably connected to the body, wherein the saddle extends circumferentially by about 180 degrees or more;
   a conduit; and
   a circumferentially continuous sealing interface carried between the first portion and the conduit, the sealing interface including a seal constructed and arranged to slide axially with respect to and supported by at least one of the first portion and the conduit,
   wherein the saddle includes a skirting for heat shielding.

* * * * *